April 17, 1951 H. J. OSTERHOF 2,549,122
PACKAGING IN STRETCHED FILM
Filed April 3, 1948

INVENTOR.
HAROLD J. OSTERHOF
BY
R. H. Waters
ATTORNEY

Patented Apr. 17, 1951

2,549,122

UNITED STATES PATENT OFFICE 2,549,122

PACKAGING IN STRETCHED FILM

Harold Judson Osterhof, Akron, Ohio, assignor to Wingfoot Corporation, Akron, Ohio, a corporation of Delaware Application April 3, 1948, Serial No. 18,831

5 Claims. (Cl. 93—3)

This invention relates to the packaging of articles in stretched film. It includes the process of packaging and apparatus for carrying out the process.

The film used for packaging is a stretched plastic film which is of unstable equilibrium and shrinks when heated. There are various plastic films on the market which might be stretched and used for the purpose. Such films include films of rubber hydrochloride (Pliofilm), vinyl chloride polymer and copolymers, vinylidene chloride copolymers, polyethylene, mixtures of (1) vinyl polymer and (2) copolymer of butadiene and acrylonitrile, etc. A preferred film for the purpose is rubber hydrochloride film.

By stretching, the area of the film is increased so that a given weight of film gives greater coverage. The cost of the film required for packaging an article may thus be decreased. Thus, rubber hydrochloride film may be stretched to several times its original area; e. g., from less than four- to more than thirty-fold. It may be stretched only laterally; in which case, on heating, it shrinks laterally. If stretched longitudinally, it shrinks longitudinally when heated. The film may be stretched in both directions—successively or simultaneously. If the stretching in both directions is not simultaneous, the tendency is for the film to shrink most in the direction in which it was last stretched.

The tendency of the film to shrink on heating has certain advantages. Thus, by enclosing an article in the stretched film and then heating the film, the wrapper may be shrunk to form a snug fit around the article. Rubber hydrochloride film appears to be unique in retaining the tendency to shrink for a considerable period after being heated even though, in the meantime, the film be cooled to room temperature. Thus, in a packaging operation in which rubber hydrochloride film is employed, if the film has been heated at any stage of the operation, it may be kept under tension until cooled and will then shrink when the tension is released. Other films shrink only while heated.

The conditions required for most perfect preservation of articles varies. For instance, fruits and vegetables immediately after picking continue to breathe, and a film permeable to the exhaled gases may give better preservation than a film which is impermeable to the transmission of such gases. Furthermore, although generally it may be desirable to use a moisture-tight film to prevent loss of moisture from the article being packaged (or to prevent the absorption of moisture by the article being packaged), some permeability to moisture may at times be desirable. Thus, a thin film which is more permeable to moisture, etc., may be preferred for wrapping certain articles than a thicker film which is more impervious. The film may be compounded with specific plasticizers or softeners, etc., to further control the permeability of the film to moisture and gases. Thus the composition and thickness of the film may be selected with a view to maintaining the article in an atmosphere best suited for its preservation.

The apparatus disclosed is designed particularly for use on film which has been simultaneously or consecutively stretched in both directions (referred to hereinafter as "double-stretched" film), the amount of stretch in each direction being sufficient to at least double the area of the film. The invention will be more particularly described in connection with the packaging of loaves of bread in rubber hydrochloride film plasticized with from 5 to 15 per cent of butyl stearate, dibutyl phthalate, dibutyl sebacate, etc., either used singly or in admixture with each other. The film is prepared from this composition by first casting from a solution, evaporating the solvent, and then heating and stretching the film thus obtained. Cast film (after evaporation of the solvent) may, for example, be up to about .0014 inch thick, more or less. On stretching, the film is stretched at least two-fold in each direction so that the resultant film used in the packaging operation is thus in the range of 0.0001 to 0.0004 inch thick.

The loaves of bread are fresh loaves, and it is important that the wrapper be relatively moisture tight although some loss of moisture is desirable. The film may advantageously include some fungicide to prevent the growth of mold. Bread packaged in such film may be preserved a relatively long time in a substantially fresh condition.

It is to be understood that although the invention is described in connection with the wrapping of bread, with slight adjustment the equipment may be used for the packaging of other articles by the same general process as herein disclosed.

Figure 1:
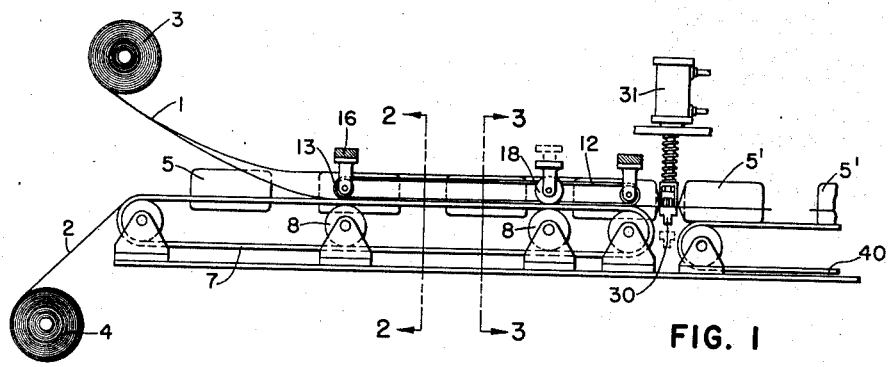
Fig. 1 is an elevation (more or less diagrammatic) of equipment which may be used and shows such equipment in use.

In wrapping the loaves of bread or other articles, two continuous, narrow strips of the stretched film are employed, and these are formed into a tube around the articles. The cut-off device may be used with a tube formed in any manner, such as a tube formed from a single sheet. The articles may be fed into the tube in any practical way.

In the drawing the thin double-stretched rubber hydrochloride films 1 and 2 are supplied from the rolls 3 and 4. The loaves 5 are fed between the films manually or by suitable automatic means.

Figure 2:
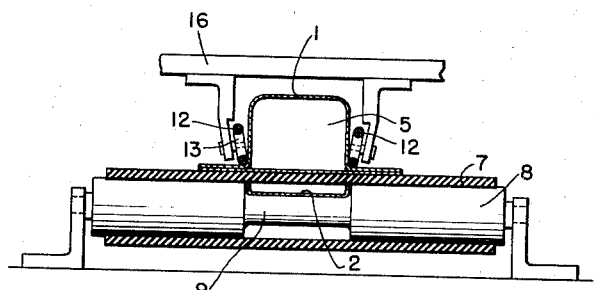
Fig. 2 is an enlarged section on the line 2—2 of Fig. 1.
Figure 3:
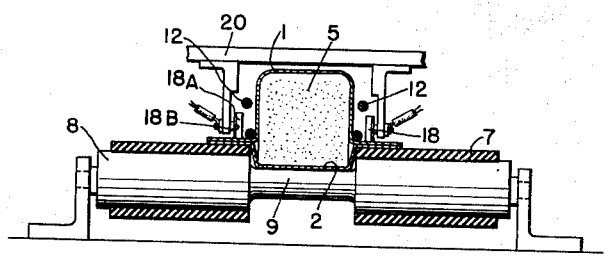
Fig. 3 is an enlarged section on the line 3—3 of Fig. 1.

The belt 7 conveys the loaves between suitable operating means to the cut-off. There are openings in the middle of the belt at spaced intervals to receive the loaves of bread, and thus the loaves are conveyed to the cut-off, supported by the lower film. Figs. 2 and 3 show the belt 7 supported by the spaced rollers 8. The central portions 9 of the rollers are of less diameter than the edges. Thus, these central portions 9 may support the loaves 5 at intervals as they are fed to the cut-off. Fig. 2 is a section through an unperforated width of the belt; whereas Fig. 3 shows the loaf 5 supported in one of the openings in the belt. The loaf is supported below by the film 2 and is covered above by the film 1. To prevent the weight of the loaf from placing too great a strain on the film 2, a separate, narrow belt may be provided to be supported by the portions 9 of the rollers 8.

The two films are sealed together near their edges. This is done by the application of heat and pressure. Ordinary heat-sealing means will not be satisfactory because of the tendency of the film to shrink when heated. Shrinking is prevented by holding the film in place while heating. This is done by the belts 12, 12 which are supported by the pulleys 13. The pulleys, in turn, are supported in suitable bearings held by the frame 16. This frame is adapted to be lifted from and lowered onto the conveyer belt. The frame is weighted or otherwise constructed in such a way as to apply pressure through the belts 12 to the films so as to prevent shrinkage when heat is applied at their edges. The belts are located closely adjacent to the loaves of bread so that the films are sealed closely adjacent the loaves.

The heat-sealing rollers 18 which unite the edges of the film are located outside of the belts. Thus, any shrinkage which occurs does not affect the film between the two belts 12. As shown in Fig. 3, the rollers 18 comprise the two parts 18a and 18b, which are in intimate contact. The wide portion 18a, which is nearest the loaf of bread, is constructed of a material which is an inferior heat conductor, such as the fibrous, non-inflammable mineral composition known as Transite, manufactured by the Johns-Manville Corporation, or the poly-tetrafluorethylene known as Teflon and made by Du Pont, or Silastic rubber, a product of the Dow-Corning Corporation. The thin portions 18b are made of steel, bronze, copper or other good heat conductor.

The rollers 18 are supported in the frame 20, and as indicated in Fig. 1, this frame is adapted to be raised and lowered. It is raised when the machine is being set up, and the two films are being spread beneath the rollers 18. Then the support is lowered so that the rollers 18 press down on the films.

The thin disk 18b is heated electrically or by other suitable means, and it is heated to a temperature of about 300° F. or higher and quickly melts its way through the two layers of double-stretched rubber hydrochloride film. The disk 18a is heated by thermal conduction from the disk 18b. It is at a lower temperature than the disk 18b and is not hot enough to melt its way through the films but is sufficiently warm, for example, at a temperature of about 230° F. to 300° F. so that it seals the two films of rubber hydrochloride together. The temperature of the disk 18a will not be uniform, but the portion adjacent the disk 18b will be hotter than that located farther from the disk 18b. The temperature will be so adjusted that the disk 18b melts through the films while they are simultaneously being sealed together by the disk 18a. The disk 18b may be of slightly greater diameter than the disk 18a although this is not necessary.

After passing under the rollers 18 where the films are trimmed and sealed together, the film will tend to contract around the loaves. While gripped between the belts 12 and the conveyer belt 7, they cannot shrink, but they do contract as soon as they pass out from under the ends of the belts 12.

Figure 4:
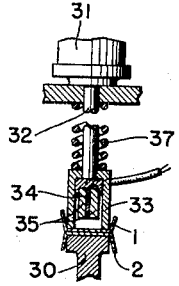
Figs. 4 and 5 are details of the cut-off device at different stages of the cutting-off operation.
Figure 5:
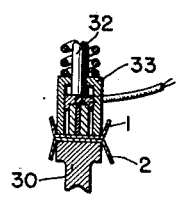

The cut-off operates intermittently. The movement of the belt is made intermittent because the film must be held motionless when the cut-off is in operation. The cut-off comprises the support 30 (which is raised and lowered as indicated in Fig. 1) and the air cylinder 31 which operates the plunger 32 (Figs. 4 and 5). Mounted on the plunger are means for holding the film and other means for cutting it off and sealing it. The holding means is the channel 33. The cut-off and sealing unit is within this channel and comprises the hot plate 34 which is located between the thicker plates 35 which are rather poor conductors of heat and are advantageously made of Transite, Teflon, Silastic rubber or the like. The elements of this cut-off and heat-sealing equipment find their counterpart in the equipment just described which is used for sealing the films longitudinally.

When the plunger 32 descends, the edges of the channel 33 press the two films tightly against the support 30 along two parallel lines. The pressure on the channel 33 is exerted through the spring 37. As the plunger 32 continues to descend, the film is contacted by the cut-off and heat-sealing element which is fixed directly to the plunger. The film is cut off by the hot plate 34 midway between the two plates of the channel 33. The sealing units 35 which flank the hot plate seal the films on opposite sides of the cut-off. Thus, as the film between each two loaves is severed, the films on opposite sides of the cut-off are sealed. These two lateral seals and the longitudinal seals made by the rollers 18 completely enclose each loaf.

As will be seen from an inspection of Fig. 1, as the channel 33 presses down on the film between the adjacent loaves, it tends to bring the loaves together. The cut-off is thus not effected in contact with the loaf but is spaced a short distance from it. As the longitudinal tension on the film is released by raising the channel 33 and lowering the support 30, the film, heated during the cut-off and sealing operation, shrinks tightly toward the ends of the loaves. Similarly, the film shrinks laterally around the circumference of each loaf as it is released from the grip of the belts 12. The film thus shrinks toward the loaf on all sides and forms a snug enclosure around it.

Fig. 1 shows the packaged loaves 5' delivered from the cut-off onto the belt 40. If for any reason the wrapper is somewhat loose on the articles after the cut-off, the conveyer 40 may take them through an oven or under radiant heat or otherwise subject them to sufficient heat to cause the enclosing films to fit snugly around the loaves.

Other modifications in the equipment shown are possible without departing from the appended claims which define the invention. Thus, the shape of the article is not an essential feature of the invention. If round articles—such as oranges, grapefruit, and the like—are being packaged, they need not fit down through openings in the belt, but the openings may be of less diameter than the fruit so that the fruit is supported at the edge of each opening. Instead of providing openings in the belt, other spacing means may be utilized. Instead of uniting the films at their edges and then cutting them off, oblong or circular or other suitable means may be provided at the cut-off for uniting and cutting away excess film from all sides of the articles simultaneously. Thus, if oranges are being packaged, circular means may come down over each orange to hold the film and then cut off and unite the two films. The cut-off blade may operate separately from the sealing blades although unitary means for cutting off and sealing will ordinarily be preferred. The articles being packaged may be conveyed to the cut-off several abreast if desired. The two films need not be of the same gauge and may be of different composition. Instead of separate films, a single film may be used and folded to cover the tops and bottoms of the articles; and in that event, one of the lateral sealing units may be omitted. The means for trimming the film along each edge, as shown in the drawings, is optional and may be omitted. Other modifications in the equipment and process will suggest themselves to persons skilled in the art.

What I claim is:

1. Packaging equipment which comprises two sources of stretched film, cut-off equipment, a conveyer for moving articles toward the cut-off equipment, and means for holding the films together on opposite sides of the articles while on the conveying means and outside of this, heated means equipped with means for bringing it into contact with the film.

2. Packaging equipment which comprises a conveyer for carrying articles to be packaged to cut-off means, toward each edge of the conveyer a belt arranged parallel with the conveyer, means for pressing the belts toward the conveyer, and heated means located outside the belts and means for pressing the same onto the belts.

3. The method of packaging articles between two pieces of thermally shrinkable, stretched, heat-sealable film which comprises enclosing successive articles in a substantially straight line between the two films by pressing the two films together along the sides of the articles, and then while thus holding the films together so as to prevent their shrinking toward the articles, heating them outside the holding means so as to unite them.

4. The method of packaging articles between two pieces of thermally shrinkable, stretched, heat-sealable film which comprises enclosing successive articles in a substantially straight line between the two films by pressing the two films together along the sides of the articles, and then while thus holding the films together so as to prevent their shrinking toward the articles, heating them outside the holding means so as to unite them, and then grasping the sealed films between each two articles by separated transverse means, and then heating the films between these means to cut through them and uniting the films by heat on each side of the cut-off effected in this manner.

5. The method of packaging articles which comprises enclosing articles in stretched film, moving the film toward cut-off means, pressing portions of the film near the respective edges of said portions together while the film is so moving and also, while the film is so moving, heating the film between said edges and the place where the film is pressed together.

HAROLD JUDSON OSTERHOF.

REFERENCES CITED

The following references are of record in the file of this patent:

UNITED STATES PATENTS

| Number | Name | Date |
| --- | --- | --- |
| 1,724,208 | Lewis | Aug. 13, 1929 |
| 2,027,232 | Hutt et al. | Jan. 7, 1936 |
| 2,142,505 | Gammeter | Jan. 3, 1939 |
| 2,195,583 | Schultz et al. | Apr. 2, 1940 |
| 2,232,783 | Hausheer | Feb. 25, 1941 |
| 2,237,119 | Smith | Apr. 1, 1941 |
| 2,257,823 | Stokes | Oct. 7, 1941 |
| 2,322,298 | Johnston | June 22, 1943 |
| 2,380,914 | Billeb | Aug. 7, 1945 |
| 2,390,550 | Moore | Dec. 11, 1945 |